(12) United States Patent
Cha et al.

(10) Patent No.: US 7,912,586 B2
(45) Date of Patent: Mar. 22, 2011

(54) INTEGRATED MANAGEMENT SYSTEM AND METHOD USING ENHANCED REMOTE COMMUNICATION PROTOCOL FOR CONTROLLING MULTI-TYPE AIR CONDITIONERS

(75) Inventors: Byoung-Keun Cha, Seoul (KR); Sang-Chul Youn, Seoul (KR); Duck-Gu Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 11/970,248

(22) Filed: Jan. 7, 2008

(65) Prior Publication Data

US 2008/0185449 A1   Aug. 7, 2008

(30) Foreign Application Priority Data

Feb. 5, 2007   (KR) .................. 10-2007-0011830

(51) Int. Cl.
G05D 23/00 (2006.01)
(52) U.S. Cl. ...................... 700/277; 700/276
(58) Field of Classification Search .............. 700/276, 700/277
See application file for complete search history.

(56) References Cited

U.S. PATENT DOCUMENTS

| 7,082,353 | B2 | 7/2006 | Kwon et al. | 700/277 |
| 2004/0204793 | A1* | 10/2004 | Yoon et al. | 700/277 |
| 2006/0212175 | A1* | 9/2006 | Kim et al. | 700/277 |

FOREIGN PATENT DOCUMENTS

| CN | 1512815 A | 7/2004 |
| KR | 10-0649599 | 11/2006 |

OTHER PUBLICATIONS

Chinese Office Action dated Nov. 6, 2009 in Patent Application No. 200810003123.5.
English language Abstract of KR 10-2005-0094260.
U.S. Appl. No. 11/945,287 to Cha et al., filed Nov. 27, 2007.

* cited by examiner

Primary Examiner — Ryan A Jarrett
(74) Attorney, Agent, or Firm — Ked & Associates, LLP

(57) ABSTRACT

An integrated management system for controlling multi-type air conditioners in which certain information related to the equipment connected to the system is added to a remote communication protocol, and operation information related to at least one air conditioner system and the type information related to the connected equipment are received from a connection controller group for storage, whereby all or many of the air conditioners installed in a particular location can be integrally maintained, managed and inspected or repaired.

9 Claims, 2 Drawing Sheets

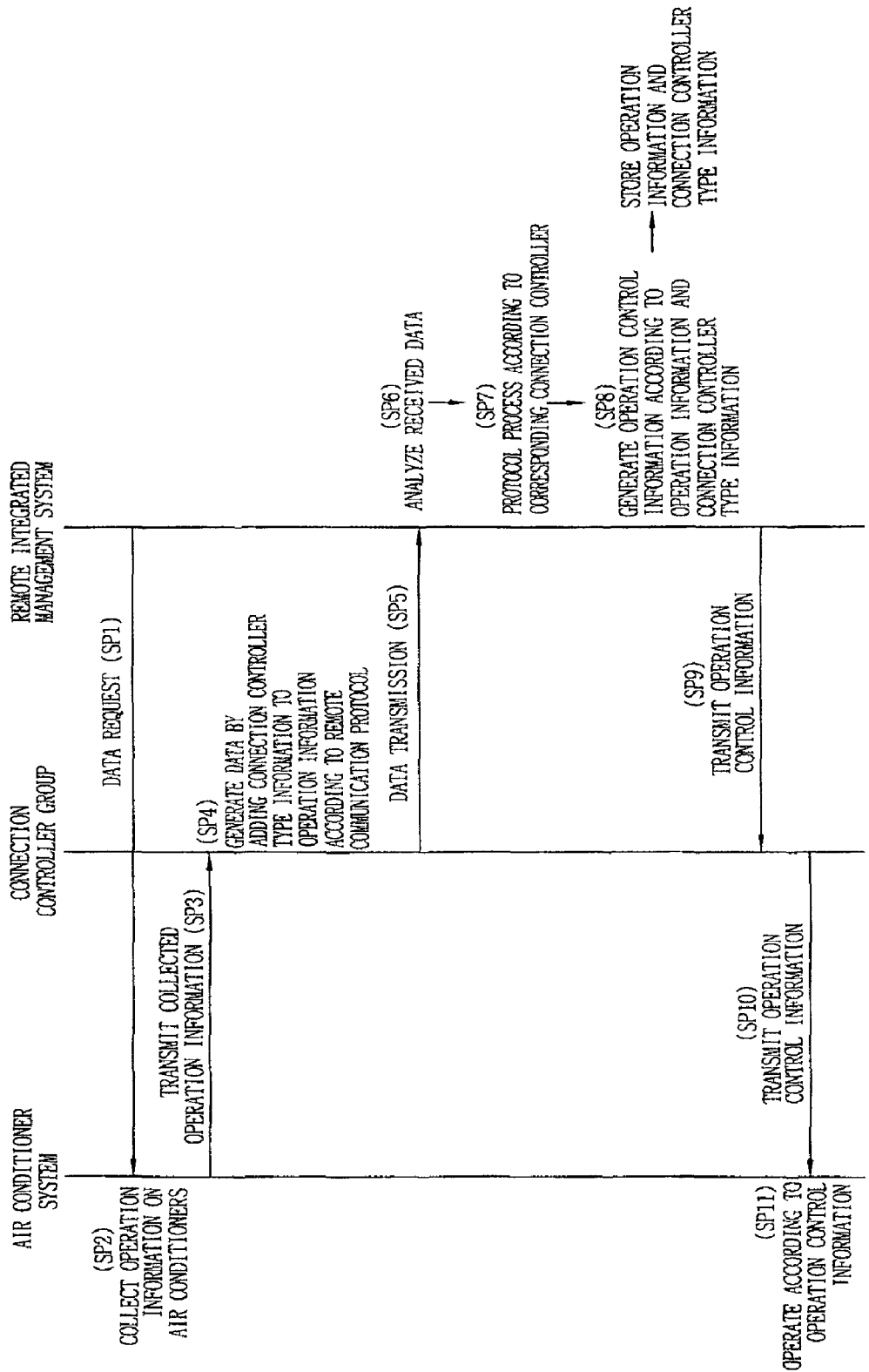

INTEGRATED MANAGEMENT SYSTEM AND METHOD USING ENHANCED REMOTE COMMUNICATION PROTOCOL FOR CONTROLLING MULTI-TYPE AIR CONDITIONERS

BACKGROUND OF THE INVENTION

1. Field of the Invention

The present invention relates to an integrated management system and method for controlling multi-type air conditioners, and more particularly, to an integrated management system and method for controlling multi-type air conditioners capable of integrally controlling multi-type air conditioners by adding information about the type of connection equipment into a body portion of a remote communication protocol.

2. Background of the Invention

Air conditioner systems are now used in most buildings and homes. For example, one type of air conditioner system includes indoor units disposed in each room of a home or in each office of a building, and an outdoor unit shared by and connected to the indoor units.

An air conditioner group denotes a grouping of a plurality of air conditioners, and an air conditioner system denotes a system managing at least one air conditioner group.

The air conditioner system may include a local controller which detects various operation states of the plurality of air conditioner groups and controls the plurality of air conditioner groups via a gateway according to the detection.

An integrated management system for controlling the multi-type air conditioners is being developed to integrally manage at least one air conditioner system from a remote location.

Also, the integrated management system for controlling the multi-type air conditioners is connected to a connection controller of each air conditioner system so as to collect operation information (i.e., cycle data) related to all of the air conditioners being operated in the corresponding air conditioner system.

The collected operation information is generated based on a remote communication protocol, and only includes operation information related to air conditioners which are currently being operated. A service manager monitors the operation information related to the corresponding air conditioners by a monitoring service, to remotely handle (or control) at least one air conditioner system.

A connection controller of each air conditioner system, namely, a central controller, collects information (e.g., product information, operation information, etc.) on its subordinate air conditioners connected thereto to thusly transmit such information to a remote integrated management system.

Here, the central controller may include a local_central_controller, an exclusive_central_controller, a building_management_central_controller, and the like.

However, the related art integrated management system for controlling the multi-type air conditioners collects operation information about the air conditioners by connecting the remote integrated management system only to the local_central_controller. Thus, the remote integrated management system can not be connected to other connection controllers, such as the exclusive_central_controller, the building_management_central_controller and the like.

SUMMARY OF THE INVENTION

The present inventors recognized at least the above described problems of the related art. Based upon such recognition, it is an object of the present invention to provide an integrated management system and method for controlling multi-type air conditioners capable of integrally maintaining, managing and inspecting/repairing all air conditioners disposed at homes or in buildings by adding type information on connection equipment to a remote communication protocol and receiving and storing operation information on at least one air conditioner system and the type information on the connection equipment from a connection controller group for use.

To achieve this, there is provided an integrated management system for controlling multi-type air conditioners comprising: at least one air conditioner system having one or more air conditioner groups; a connection controller group having at least one connection controller connected to the at least one air conditioner system, and configured to convert first information data related to the at least one air conditioner system based on a remote communication protocol and transmit the converted first information data; and a remote integrated management system configured to receive the first information data from the connection controller group, and remotely control the at least one air conditioner system based on the received first information data.

The connection controller group may comprise: a local_central_controller configured to control a subordinate air conditioner group connected thereto via a gateway; a central controller configured to control a subordinate air conditioner group directly connected thereto; and a building_management_central_controller configured to control an air conditioner group located in a building.

Here, the remote integrated management system may comprise: a connection controller identifying module configured to analyze data received from the at least one air conditioner system and identify a type of a connection controller based on the analyzed result; a protocol process module configured to perform an appropriate protocol process for the data received from the at least one air conditioner system according to the type of the connection controller identified by the connection controller identifying module; and a database server configured to store the data processed by the protocol process module.

In accordance with one embodiment of the present invention, there is provided an integrated management method for controlling multi-type air conditioners comprising: a first step of generating first information data on at least one air conditioner group based on a remote communication protocol and transmitting the generated data; a second step of receiving and analyzing the first information data generated according to the remote communication protocol, and generating and transmitting operation control information based on the analyzed result according to the remote communication protocol; and a third step of analyzing the received operation control information according to the remote communication protocol and operating air conditioners according to the analyzed result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flowchart illustrating an integrated management method for controlling multi-type air conditioners in accordance with the present invention.

DETAILED DESCRIPTION OF THE INVENTION

Figure 1:
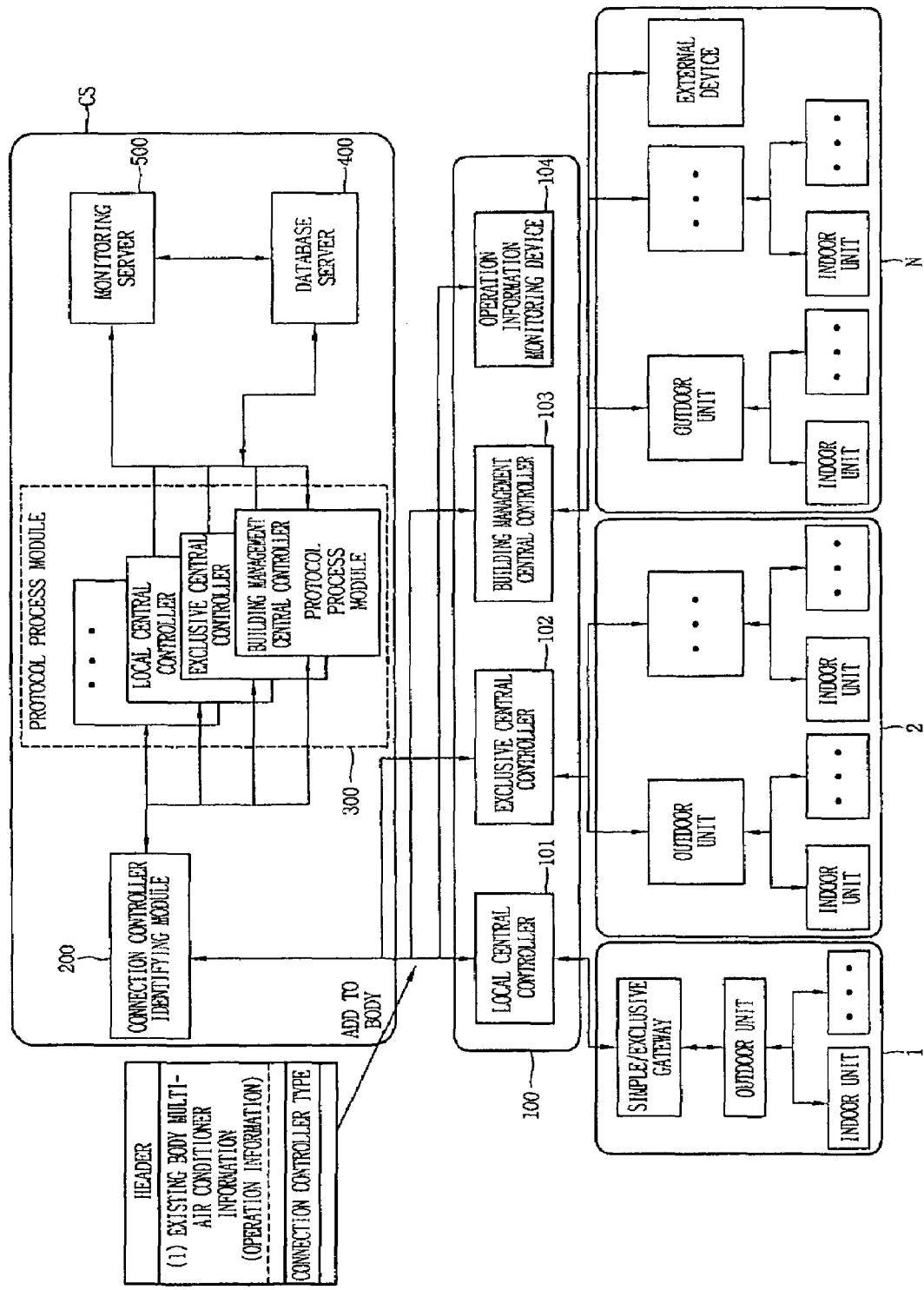
FIG. 1 is a block diagram illustrating an integrated management system for controlling multi-type air conditioners in accordance with one embodiment of the present invention.

Reference will now be made in detail to some embodiments of the present invention, examples of which are illustrated in the accompanying drawings.

FIG. 1 is a block diagram illustrating an integrated management system for controlling multi-type air conditioners in accordance with one embodiment of the present invention.

As illustrated in FIG. 1, the integrated management system may comprise multiple air conditioner systems (1 to N), a connection controller group (100) and a remote integrated management system (CS).

Each air conditioner system (1 to N) includes at least one air conditioner group provided with a local_central_controller which is connected to multi-type air conditioners via a gateway, at least one air conditioner group connected to an exclusive_central_controller which is directly connected to multi-type air conditioners, and at least one air conditioner group connected to a building_management_central_controller which is directly connected to multi-type air conditioners.

Here, the air conditioner system (1 to N) may transmit operation information related to the at least one air conditioner group to the connection controller group (100).

The connection controller group (100) includes at least one connection controller connected to the at least one air conditioner system (1 to N). The connection controller group (100) converts operation information on the air conditioner group (1 to N) and type information on a connection controller according to a remote communication protocol and transmits the converted data.

The connection controller group (100) may include a local_central_controller (101) (or some other entity providing local central control) for controlling a subordinate air conditioner group connected thereto via a gateway, an exclusive_central_controller (102) (or some other entity providing exclusive central control) for controlling a subordinate air conditioner group directly connected thereto; a building_management_central_controller (103) (or some other entity providing building management central control) for controlling an air conditioner group installed in a building, and an operation information monitoring device (104) (or some other entity performing the monitoring of operation information) for monitoring operation information on a subordinate air conditioner group connected thereto.

Here, the air conditioner group denotes an air conditioning installation arrangement including a plurality of air conditioners capable of satisfying cooling requirements of a building by connecting at least one indoor unit to one outdoor unit. It is possible not only to separately control each air conditioner using an indoor unit disposed in each room or location, but also to integrally control every air conditioner in the building at a certain location by means of a local controller (or some other type of control entity).

The remote integrated management system (CS) receives the converted data from the connection controller group (100), and accordingly, remotely controls the at least one air conditioner system (1 to N) based on the received data.

Here, the remote integrated management system (CS) may include a connection controller identifying module (200) (or some other entity) for analyzing data received from the air conditioner system (1 to N) and identifying a type of a connection controller (101, 102 or 103) based on the analysis, a protocol process module (300) (or some other entity) for performing an appropriate protocol process for the data received from the air conditioner system (1 to N) according to the corresponding type of the connection controller (101, 102 or 103) identified by the connection controller identifying module (200), a database server (400) (or some other entity) for storing the data processed by the protocol process module (300), and a monitoring server (500) (or some other entity) for displaying operation information and the type of the connection controller (101, 102 or 103) in the air conditioner system (1 to N), such information which a service manager (or operator) wants to know.

Here, the data received from the connection controller group (100) may be constituted with a header portion including data such as information related to each air conditioner system (1 to N), version information, and the like, and a body portion including an outdoor unit identifier (ID), a group number, an operation state, an operation mode, connection controller type information, and the like.

That is, the data can be configured by further including the type information related to the connection controllers (101 to 103). Here, the type information related to the connection controllers (101 to 103) may be included in the data, instead of setting information as a component of the data.

Here, the monitoring server (500) displays operation information about an air conditioner system (1 to N) and connection controller type information, such information which a service manager desires to know.

The monitoring server (500) may be set to automatically display operation information about an air conditioner system (1 to N) and connection controller type information, which a service manager desires to know.

Hereinafter, an operation of the integrated management system for controlling the multi-type air conditioners according to the present invention having such configuration will be described with reference to the drawing.

First, according to the present invention, by changing (i.e., augmenting, extending, modifying, etc.) some portions of a remote communication protocol, the protocol can be set such that connection controller type information is included in data transmitted and received between the remote integrated management system (CS) and the connection controller group (100).

The data to which the connection controller type information is added can be implemented with ease, and the existing network environment requires little or practically no modification.

The remote integrated management system (CS) requests data from the at least one air conditioner system (1 to N) via the connection controller group (100) (SP1).

The at least one air conditioner system (1 to N) then collects operation information related to an air conditioner group currently operated therein (SP2), and sends the collected operation information to a corresponding connection controller (101 to 103) of the connection controller group (100) (SP3).

Here, description will be made under an assumption that the air conditioner system (1 to N) is connected to the building management central controller (103).

The data to be transmitted from the building management central controller (103) of the connection controller group (100) is generated by adding type information about the connection controller (101 to 103) based on a remote communication protocol according to the present invention to the operation information on the corresponding air conditioner system (1 to N) (SP4).

Then, the building management central controller (103) of the connection controller group (100) transmits the data generated based on the remote communication protocol to the remote integrated management system (CS) (SP5). The remote integrated management system (CS) analyzes the data received from the building management central controller (103) of the connection controller group (100) (SP6), and generates operation control information based on the operation information and the connection controller type information according to the analysis (SP7 and SP8).

Here, the operation of the remote integrated management system (CS) will be described in more detail.

First, the connection controller identifying module (200) analyzes data received from the building management central controller (103) of the connection controller group (100) (SP6) to identify a connection controller type, and applies a signal based on the identification to the protocol process module (300).

Accordingly, the protocol process module (300) processes the signal outputted from the connection controller identifying module (200) using a protocol of the corresponding connection controller (101 to 103) according to the identified result by the connection controller identifying module (200). The protocol process module (300) then stores operation information and connection controller type information according to the processed result in the database server (400), and simultaneously displays the operation information and the connection controller type information on the monitoring server (500) (SP7).

Here, the monitoring server (500) generates the operation control information based on the connection controller type information and the operation information (SP8).

The monitoring server (500) of the remote integrated management system (CS) displays the operation information related to the air conditioner system (1 to N) and the connection controller type information both desired by a service manager, which are set to be automatically or manually displayed.

The remote integrated management system (CS) transmits the control information based on the operation information and the connection controller type information to the building management central controller (103) of the connection controller group (100) (SP9). Accordingly, the building management central controller (103) of the connection controller group (100) operates the multi-type air conditioners subordinately connected thereto based on the control information (SP10 and SP11).

That is, the features of the present invention allow a remote communication protocol to be modified such that connection controller type information can be added to the transmission data between the air conditioner system and the remote integrated management system.

The integrated management system of the present invention can be applied to a system having multi-type air conditioners, a single air conditioner, and components included in each air conditioner.

The features described herein are related to a data structure for a remote communication protocol used in communicating information between a connection controller group (100) and a remote integrated management system (CS), the data structure comprising: a header portion containing header information; a body portion containing information used for operating a multiple air conditioner system; and an indicator added into at least one of the header portion and the body portion.

This indicator is used to indicate information related to one or more connection controllers (101~104) of the connection controller group (100) to allow the remote integrated management system (CS) to recognize the one or more connection controllers (101~104) and manage various operations performed by one or more devices (1 to N) connected respectively with the one or more connection controllers (101~104).

In other words, the embodiments of the present invention have been described in detail with reference to the drawings; however, they should not be construed as limiting the scope of the present invention. Also, it can be understood by those skilled in the art that many variations can be implemented within the scope as defined in the appended claims.

As described above, in the integrated management system for controlling multi-type air conditioners according to the present invention, by adding connection controller type information to a remote communication protocol and receiving and storing operation information on at least one air conditioner system and the connection controller type information from a connection controller group for use, a plurality of air conditioners disposed at homes or in buildings can be integrally maintained, managed and inspected/repaired.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An integrated management system for controlling multi-type air conditioners, the system comprising:
    at least one air conditioner system having one or more air conditioner groups;
    a connection controller group having at least one connection controller connected to the at least one air conditioner system, and configured to convert first information data related to the at least one air conditioner system based on a remote communication protocol and transmit the converted first information data; and
    a remote integrated management system configured to receive the first information data from the connection controller group, and remotely control the at least one air conditioner system based on the received first information data, wherein the remote integrated management system includes:
        a connection controller identifying module configured to analyze data received from the at least one air conditioner system and identify a type of the connection controller based on the analyzed result;
        a protocol process module configured to perform an appropriate protocol process for the data received from the at least one air conditioner system according to the type of the connection controller identified by the connection controller identifying module; and a database server configured to store the data processed by the protocol process module.

2. The system of claim 1, wherein the first information data comprises one or more of operation information and connection controller type information.

3. The system of claim 1, wherein the received first information data comprises:

a header including at least one data of information related to the at least one air conditioner system and version information; and a body including at least one data of an outdoor unit identifier, a group number, an operation state, an operation mode, or connection controller type information.

4. The system of claim 1, wherein the connection controller group comprises:

a local central controller configured to control a subordinate air conditioner group connected thereto via a gateway;

a central controller configured to control a subordinate air conditioner group directly connected thereto; and a building management central controller configured to control an air conditioner group located in a building.

5. The system of claim 1, wherein the remote integrated management system further comprises a monitoring server configured to display connection controller type information related to a desired air conditioner system and operation information on the air conditioner system.

6. An integrated management method for controlling multi-type air conditioners, the method comprising:

converting, at one or more connection controller of at least one connection controller group connected to at least one air conditioner group, first information data related to the at least one air conditioner group based on a remote communication protocol and transmitting the converted first information data; and receiving and analyzing, at a remote integrated management system configured to receive the converted first information data from the at least one connection controller group, the first information data, wherein the receiving and analyzing at the remote integrated management system includes:

analyzing and identifying, at a connection controller identifying module, a type of the at least one connection controller based on the analyzed result;

performing, at a protocol process module, an appropriate protocol process for the data received from the at least one air conditioner group according to the type of the connection controller identified by the connection controller identifying module; and storing the data processed by the protocol process module on a database server.

7. The method of claim 6, wherein the first information data comprises one or more of operation information and connection controller type information.

8. The method of claim 6, wherein the receiving and analyzing comprises extracting and storing connection controller type information from the received data.

9. The method of claim 6, further comprising displaying connection controller type information and operation information both related to the air conditioner system.

* * * * *